United States Patent
Eisenbeiss et al.

(10) Patent No.: US 12,411,055 B2
(45) Date of Patent: Sep. 9, 2025

(54) METHOD AND TEST BENCH FOR PREDICTING PRESSURE OSCILLATIONS IN A VEHICLE TIRE

(71) Applicant: ZF Friedrichshafen AG, Friedrichshafen (DE)

(72) Inventors: Jens Eisenbeiss, Fuerstenzell (DE); Roland Bösl, Neuburg am Inn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 556 days.

(21) Appl. No.: 17/609,197

(22) PCT Filed: May 8, 2020

(86) PCT No.: PCT/EP2020/062853
§ 371 (c)(1),
(2) Date: Nov. 5, 2021

(87) PCT Pub. No.: WO2020/225416
PCT Pub. Date: Nov. 12, 2020

(65) Prior Publication Data
US 2022/0228941 A1 Jul. 21, 2022

(30) Foreign Application Priority Data
May 8, 2019 (DE) ...................... 10 2019 206 603.8

(51) Int. Cl.
*G01M 17/02* (2006.01)
*G01M 1/22* (2006.01)

(52) U.S. Cl.
CPC .......... *G01M 1/225* (2013.01); *G01M 17/025* (2013.01)

(58) Field of Classification Search
CPC ..................................... G01M 1/225
See application file for complete search history.

(56) References Cited

U.S. PATENT DOCUMENTS

| 5,606,122 A | 2/1997 | Taguchi et al. |
| 10,760,984 B2 | 9/2020 | Eisenbeiss et al. |
| 2015/0300921 A1* | 10/2015 | Nicholson ............. G01M 17/02 73/146 |

FOREIGN PATENT DOCUMENTS

| CN | 105555555 A | * | 5/2016 | ......... B60C 23/0486 |
| DE | 102 60 000 A1 | | 7/2004 | |

(Continued)

OTHER PUBLICATIONS

International Search Report Corresponding to PCT/EP2020/062853 mailed Sep. 9, 2020.

(Continued)

*Primary Examiner* — Alexander A Mercado
(74) *Attorney, Agent, or Firm* — Finch & Maloney PLLC (57) ABSTRACT

A test bench and a method to predict pressure oscillations in a vehicle tire. The tire is rotatably positioned, via a bearing on a test bench rim, the tire is pressurized with fluid, a load is applied on the tire, the tire is accelerated according to pre-determinable speed ramp to a final speed, the fluid in accordance with the tire speed, undergoes an oscillation excitation, and reacts to the oscillation excitation with a pressure oscillation. The method is characterized in that an effective force of the tire, due to the pressure oscillation, at the bearing is continuously detected, and that a descriptive data set is determined for the tire speed over the frequency, a timing signal of the speed ramp undergoes a Fourier transformation and, in an analogous manner, a reference data set is created through the use of a vehicle rim instead of the test bench rim.

13 Claims, 3 Drawing Sheets

(56) References Cited

FOREIGN PATENT DOCUMENTS

| DE | 10 2015 224 636 A1 | | 6/2017 | |
|---|---|---|---|---|
| DE | 102016200778 A1 | * | 7/2017 | |
| DE | 102017109647 A1 | * | 11/2018 | |
| DE | 102017109650 A1 | * | 11/2018 | |
| EP | 2862731 A1 | * | 4/2015 | ......... B60C 23/0477 |
| JP | 2009020123 A | * | 1/2009 | |
| WO | 2014/092722 A1 | | 6/2014 | |

OTHER PUBLICATIONS

Written Opinion Corresponding to PCT/EP2020/062853 mailed Sep. 9, 2020.

* cited by examiner

METHOD AND TEST BENCH FOR PREDICTING PRESSURE OSCILLATIONS IN A VEHICLE TIRE

This application claims is a National Stage completion of PCT/EP2020/062853 filed May 8, 2020, which claims priority from German patent application serial no. 10 2019 206 603.8 filed May 8, 2019.

FIELD OF THE INVENTION

The present invention concerns a method for predicting pressure oscillations in a vehicle tire in accordance with the generic term of the independent claim(s) and a test bench for the prediction of pressure oscillation in a vehicle tire in accordance with the generic term of the independent claim(s).

BACKGROUND OF THE INVENTION

Known in the state of the art are so-called "high-speed uniformity" measurements on vehicle tires through which the synchronization properties of the tires can be determined at high speed or tire rotational speeds, respectively. The synchronization properties includes especially the presence of forces due to oscillation resonances at certain rotational speeds, whereby the oscillation resonances are generally unwanted. This excitation of oscillation resonances is hereby caused through different reasons such as stiffness variations, geometry defects, thickness variations, or imbalances of the vehicle tire. The tested vehicle tires must be within specified limit values with regard to the frequencies of the occurring resonances or with regard to the amplitudes of the observed resonances in order to be suitable for the intended purpose, e.g. on a sports car or a truck.

In this context, the publication DE 102 60 000 B4 teaches a wheel power dynamometer for the measurement of tire forces, whereby a vehicle wheel is mounted along a wheel axis via a roller bearing on a hollow shaft. The hollow shaft is hydro-statically installed in an enclosure of a frame and has an enclosure in which the power sensors are positioned for the measurement of forces. The forces which are acting at the wheel are therefore transmitted to the hollow shaft through the wheel axle which itself floats frictionless through hydrostatic in the enclosure.

Known through the publication DE 10 2015 224 636 A1 is a wheel force dynamometer for the measurement of tire forces. Forces and torques which are present at a vehicle tire are measured by means of force sensors, whereby the vehicle wheel is mounted rotatably by means of a wheel axle. The wheel axle is designed as a hollow shaft, which is mounted on a rigid, stationary bearing journal. Hereby, the wheel axle presents a maximal resistive torque and a high bending stiffness.

The known methods for the determination of tire properties in the framework of production control by means of known fixtures have however a disadvantage because they do not take into consideration the oscillations of the fluid, generally air, in the vehicle tire.

SUMMARY OF THE INVENTION

It is the task of the invention to propose an improved method for the prediction of pressure oscillations in a vehicle tire.

This task is, in accordance with the invention, achieved by the method of predicting pressure oscillations in a vehicle tire in accordance with the independent claim(s). Advantageous embodiments and continued designs of the invention arise from the dependent claims.

The invention concerns a method for the prediction of pressure oscillations in a vehicle tire, the vehicle tire is rotatably mounted on a test bench rim via a wheel bearing, the vehicle tire is pressurized by means of a fluid, the vehicle tire being subjected to a wheel load, the vehicle tire, in accordance with a predetermined speed ramp, is accelerated to a final speed, the fluid, in accordance with a tire speed, experiences an oscillation excitation, and the fluid reacts to the oscillation excitation with a pressure oscillation. The method according to the invention is characterized in that a force acting from the vehicle tire due to the pressure oscillation on the wheel bearing is continuously recorded and that a data set describing the force over the tire speed and over a frequency is generated by subjecting a time signal of the speed ramp to a Fourier transformation and that a descriptive data set is generated in an analogous manner using a vehicle rim instead of the test bench rim.

It is therefore also provided to predict pressure oscillations in a vehicle tire in that the vehicle tire is mounted on a test bench rim and is rotatable positioned through a wheel bearing. A test bench rim is to be understood as a rim which is used for tire tests on industrial test benches. Such a test bench rim comprises generally two axial halves which, coming from both axial sides of the vehicle tire, are inserted into the central tire opening, acting as an interior pressure chamber in accordance with a conventional vehicle rim, and close it in a pressure tight manner. The use of a test bench rim leads here generally to a different rolling behavior of the vehicle tire, in particular to a different behavior of the pressure oscillations in the vehicle tire as compared to a conventional vehicle rim. Further, the vehicle tire is supplied in its interior with pressure, preferably air as fluid, whereby the air preferably is passed through a fluid supply opening of the test bench rim into the interior area of the vehicle tire until a pre-determined pressure is reached. This pressure corresponds preferably to a conventional operating pressure of the vehicle tire when used with a motor vehicle. When the pre-determined pressure is reached, the vehicle tire is accelerated to its final speed. The acceleration follows a pre-determinable speed ramp, the speed ramp preferably starts at a tire speed of zero, that is to say when the vehicle tire is stationary, and ends with the final speed. Alternatively preferred, the speed ramp can also start at a speed higher than zero. For instance, a speed range below the speed ramp can be passed through as fast as possible before the actual speed ramp is passed through, under defined test conditions such as in particular a defined internal pressure and a defined wheel load. The final speed is hereby pre-determinable as well as the increase of the tire speed, meaning the acceleration, whereby the speed ramp should be preferably constant, meaning that the acceleration during the passing through the speed ramp never becomes negative. Alternatively, the speed ramp can also be passed through backwards, that is to say, in particular, have exclusively negative accelerations and have no positive accelerations. It is also conceivable and preferred to passing through individual or several speed ranges of the speed ramp either forward, meaning with positive acceleration, and backwards, meaning with negative acceleration. A preferred acceleration of the speed ramp can be for instance 1 km/hr. This acceleration represents in many cases a good compromise between a swift passing through the speed ramp on one side and a sufficiently high measurement accuracy on the other side. Since the vehicle tire has a bearing through the wheel bearing and because the wheel bearing is preferably a part of the test bench, the vehicle tire during the execution of the inventive method is positioned stationary on the test bench. Accordingly, the term "tire speed" is understood, in the sense of the invention, as a rolling speed of the vehicle tire, for instance on a rolling drum or on a belt. In the technical sense, the vehicle tire is hereby accelerated to a determined angular speed and the tire speed, in the sense of the invention, results from multiplying the angular speed and the radius of the vehicle tire. At a tire speed larger than zero, the vehicle tire rotates over the wheel bearing whereby the vehicle tire is excited to speed dependent higher oscillations with a tire frequency. These tire oscillations are also transmitted to the fluid, that is to say preferably the air, inside the vehicle tire and there also stimulate a speed-dependent pressure oscillation with a pressure frequency. Depending on the resonant frequencies of the fluid, the amplitudes of the pressure oscillations are more or less pronounced, whereby the amplitude generally increases the closer the exciting oscillations get closer to the resonant frequency of the fluid. The resonant frequencies of the fluid are in turn mainly characterized by the pressure which is applied with a fluid in the interior area of the vehicle tire, as well as the geometry of the vehicle tire, for instance through the size and the width of a vehicle tire. The frequencies of pressure oscillation which occur in passenger cars are typically in the frequency range between 170 Hz and 250 Hz. The pressure oscillation of the fluid, as well as the tire oscillation of the vehicle tire, act as a detectable force on the wheel bearing, where it can be detected for instance by means of appropriately designed and positioned force sensors. Since the pressure oscillations in the interior of the vehicle tire also during the real operation of the vehicle tire on a motor vehicle also generate an oscillation at the vehicle rim, which can transmit itself again through the wheel suspension to the motor vehicle, it is therefore important that the oscillation behavior of the fluid in the interior of the vehicle tire is known. The force sensors capture a static force which is for instance defined as wheel load and carried out on the vehicle tire, as well as has a dynamic force which arises through the rolling of the vehicle tire at different speeds. The larger the effective, captured force is, which functions in the wheel bearing, the higher is naturally its respective basic amplitude of the pressure oscillation or tire oscillation, respectively. Thus, the detected force can advantageously be used as a measure of the amplitude of the pressure oscillation or tire oscillation, respectively. The pressure oscillations or tire oscillation, respectively, occur not only in the first order, but also in higher orders so that amplitudes of pressure oscillations or tire oscillations, respectively, of higher orders, as well as non-integer orders can be recorded. The force is hereby in accordance with the invention recorded continuously during a complete passing through the speed ramp, meaning not only at certain, predetermined speed steps or in certain, predetermined speed windows. A timing signal of the known speed ramp is then applied to a Fourier transformation to create a descriptive data set of the force over the tire speed in over the frequency. In the context of the invention, the term "frequency" encompasses both the frequency of the tire vibration of the vehicle tire, that is to say the tire frequency, that is to say also the frequency of the pressure vibration of the fluid, that is to say the pressure frequency. The term "frequency" is used accordingly as a generic term for the terms "tire frequency" and "pressure frequency". The timing signal is preferably a change of the captured tire force over time during the passing through of the speed ramp. This eliminates the static force, in particular the wheel load, from the data set. In addition, according to the invention, a reference data set is generated which differs from the generated data set only in that data is used for its generation that was not recorded by means of a test bench rim, but rather by means of a vehicle rim. A vehicle rim is disadvantageous compared to a test bench rim in industrial testing operations in that a tire change is comparatively lengthy and thus delays the testing operation. However, a vehicle rim offers an advantage in view of the test bench rim because the oscillation behavior of the fluid in the interior of the vehicle tire corresponds to the actual oscillation behavior during a drive operation of the vehicle tire and a motor vehicle. The reference data set preferably comprises frequencies of the pressure oscillations and the tire oscillations up to approximately 300 Hz. In accordance with the invention, it does not matter whether the data set or the reference data set are generated first. It is only important that the data set and the reference data set differ in the type of rim used for their generation, but that the data used to generate them are otherwise created under identical test conditions, meaning pressure, wheel load, and speed ramp.

The fact that the reference data set is created in an analogous way as the data set during the use of a vehicle rim means in the sense of the invention that the vehicle tire is positioned on a vehicle rim with a wheel bearing, the vehicle tire is pressurized by means of a fluid in its interior, the wheel load is applied to the vehicle tire, the vehicle tire, in accordance with a predetermined speed ramp, is accelerated to the final speed, the fluid in accordance with the tire speed undergoes an oscillation excitement, the fluid reacts to the oscillation excitement with a pressure oscillation, an effective force acting on the wheel bearing from the vehicle tire due to the pressure oscillation, is continuously detected, and a reference data set describing the force over the tire speed and over a frequency is generated by subjecting time signal of the speed ramp to a Fourier transformation.

As has been shown, the pressure oscillation of the fluid significantly influence the generated data set, in particular the force depending on the pressure frequency at different tire speeds which is also contained in the data set. An analysis of the data set allows therefore a reliable statement about the pressure oscillations in a vehicle tire.

While the data set comprises the force over the tire speed and over the frequency, in particular for oscillations of a multitude of different orders, it is therefore a three-dimensional data set which describes the effective force acting on the wheel bearing as a function of the tire speed and the frequency.

The oscillations can occur along different oscillation degrees of freedom in the fluid. Generally, two different oscillation degrees of freedom can be observed.

It is preferably provided that the speed ramp increases not only steadily, but continuously increasing until reaching the final speed.

It is provided in accordance with a preferred embodiment of the invention that in the data set and in the reference data set, the amplitudes and positions of resonances of the fluid are determined, with the vehicle tire in its standstill condition, by means of two intersecting straight lines. This is because is has been found that the amplitudes and the positions of resonances within the spectrum of the detected tire pressure oscillations can be determined in a comparatively simple manner by means of two straight lines that intersect when the vehicle tire is at a standstill. A comparatively elaborate and calculation intense analysis of the pressure oscillation for the determination of the amplitudes and positions of resonances of the fluid can therefore be omitted. Because of the rotational movement of the vehicle tire, the position of amplitudes which can be attributed to resonances of the fluid is split up, which is dependent on the speed and increases with increasing speed of rotation. Since the width of the branching is dependent on the tire speed or rotational speed, respectively, it is still zero when the vehicle tire is stationary. As is shown, such a branching can be reproduced by means of two straight lines.

The amplitudes and positions of those resonances determined which can be attributed to the tire structural oscillations are also preferably determined. Resonances of the tire structure oscillations are for instance recognized by the fact that they are positioned away from the intersecting straight lines when the vehicle tire is at a standstill. In addition, they are typically at comparatively lower frequencies then the resonances of the pressure oscillations.

It is provided in accordance with an especially preferred embodiment of the invention that starting from the standstill of the vehicle tire, the straight lines are laid by maxima of forces of different oscillation orders that fork in a V-shape. The maxima correspond hereby with occurring resonances of the fluid. The forces are a measure of the amplitudes of the captured oscillations. As it was already described, the rotational movement of the vehicle tire leads to a speed dependent branching of the positions of the amplitudes which can be traced back to the resonances of the fluid. Therefore, with an increasing tire speed, the branching increases further beginning at a standstill of the tire where there is yet no branching, because the rotational speed is here zero. The maxima of the forces or amplitudes, respectively, as long as they are based on pressure oscillations and not tire oscillation, and are running further apart again with an increasing tire speed, meaning that they are branching in a V-shape. Now, through the placing of the two straight lines, starting with the standstill of the vehicle tire, through the V-shaped maxima, the resonances of the pressure oscillations of all captured orders can easily be determined because each intersection of the straight lines with a maximum represents a resonance of the fluid.

It is provided in an especially preferred embodiment of the invention that exclusively maxima of oscillation orders larger than the tenth order are considered. Detailed measurements and observations have shown that resonances, which can be traced back to pressure oscillation of the fluid in the interior of the vehicle tire, cannot be observed in oscillation orders, in at least passenger cars, which are lower than or equal to the tenth order. Thus, the area of the data set within which the search for resonances of the fluid is carried out can be restricted from the start, which further simplifies the determination of these resonances.

It is provided in an especially preferred embodiment of the invention that exclusively the maxima in a frequency range of 140 Hz to 400 Hz are considered. As it also turned out that during pressure oscillations of the fluid in the vehicle tire that declining maxima can generally not be seen in oscillation orders which are lower than or equal to the tenth order, and that these maxima at least for passenger cars are generally present in the frequency range of 140 Hz to 300 Hz. Thus, the area of the data set, in which resonances of the fluid are being searched, can be limited regarding the frequency range. It enables another additional simplification of the determination of resonances.

It is provided in an additional preferred embodiment of the invention that a relative ratio is created in the reference data set from amplitudes of resonances of the fluid and amplitudes of resonances of the structure of the same order of the vehicle tire, and/or a second relative ratio is created from positions of resonances of the fluid and positions of resonances of the vehicle tire of the same order. The "position" of a resonance is understood to mean the frequency at which the respective resonance occurs. If now these particular amplitudes of the resonances of the fluid are being positioned with each other into a first relative ratio also with the amplitudes of the resonances of the structure of the vehicle tire, and the positions of resonances of the fluid and resonances of the vehicle tire are put into a second relative ratio, a mathematical correlation can be established between the amplitudes or positions, respectively, of the resonances of the fluid and the amplitudes or positions, respectively, and the resonances of the vehicle tire.

It is provided in a specially preferred embodiment of the invention that through the amplitudes of resonances of the structure of the vehicle tire, which are contained in the data set, and the first relative ratio the amplitudes of resonances of the fluid are determined, and/or that through the positions of resonances of the vehicle tire, which are contained in the data set, and the second relative ratio the position of resonances of the fluid are determined. Hereby, the surprising realization is utilized that the amplitudes and positions of the resonances of the structure of the vehicle tire remain essentially unchanged regardless of whether the vehicle tire is installed on a vehicle rim or a test bench rim. Only the amplitudes and positions of the resonances of the fluid are changing depending on the rim version. Thus, by use of the first or second relative ratio, the test bench rim can be used advantageously for the generation of the data set which represents a significant advantage due to the comparable short installation time of a few seconds, in particular in the industrial test operation, and the amplitudes and positions of the resonances of the fluid can still be arithmetically determined in the actual drive operation. For instance, the position of a resonance of the twelfth order of the fluid can be determined from the position of a resonance of the twelfth order of the vehicle tire and the second relative ratio.

It is provided in accordance with an additional embodiment of the invention that the classification of a vehicle tire takes place where the amplitudes of resonances of the fluid are compared with reference amplitudes over a pre-determinable frequency spectrum, as well as a tire speed spectrum in an established spanned window. The window presents hereby over the frequency spectrum and the tire speed spectrum in each case a specified frame in which its amplitudes of the resonances of the fluid cannot exceed a pre-determinable value of the reference amplitudes, so that the vehicle tire can be provided with the respective classification. If the amplitudes of the resonances of the fluid in this case do not exceed the predetermined reference amplitudes of the frequency spectrum and the tire speed spectrum in the establish window, the vehicle tire is accordingly specified. Otherwise, the vehicle tire is not classified. It can be sufficient here that just one single amplitude of the resonances of the fluid exceeds its assigned reference amplitude to not classify the vehicle tire. The window can comprise at least one reference amplitude or several reference amplitudes. The amplitudes, as well as the reference amplitudes are each represented by the detected force.

It is especially preferred that a multitude of the amplitudes of the resonances of the fluid are compared with a multitude of reference amplitudes in a multitude of established windows with pre-determinable frequency spectrum over the tire speed spectrum. Thus, the vehicle tire can be classified regarding a multitude of different tire properties.

The classification preferably takes place automatically in the form of a software algorithm which is executed by an electronic control unit designed for this purpose.

It is provided in an especially preferred embodiment of the invention that the window or a multitude of windows, respectively, are assigned based on an intended use of the vehicle tire. This creates the advantage that the vehicle tire can be classified in a simple way to the effect that it is suitable for the intended use assigned to the respective window. For instance, the requirements of a vehicle tire for a sports car are different from the requirements of a vehicle tire for a SUV, truck, or agricultural machine.

It is provided in a preferred embodiment, in accordance with the invention, that the Fourier transformation is a fast Fourier transformation. Hereby, the fast Fourier transformation is an algorithm for a comparable, efficient, and fast calculation of the so-called discrete Fourier transformation. Hereby, the generation of the data set according to the invention is made simpler and accelerated, and at the same time, lesser computing power is needed for the execution of the Fourier transformation.

It is especially provided in accordance with a preferred embodiment of the invention that the data set and the reference data set comprise a tire force value for each value pair of tire speed and tire frequency. Thus, the force is not only recorded continuously, but the force values continuously recorded in this way are also used to generate the data record, so that the data record also has the continuously recorded force values. As a result, the data set is much more comprehensive than comparable data sets in accordance with the state-of-the-art. The consideration of the tire properties is not limited to the particular measurement ranges. It is namely also a finding of the invention that certain defects or undesired tire properties, in particular pressure oscillations in the vehicle tire, do not occur or are not recognizable in all speed ranges or frequency ranges. Since the reference data set is also based on continuously captured force values and also exhibits them, the respective mathematical determination of the positions of resonances of the fluid can be carried out completely and comprehensively based on the relative ratios.

The invention concerns in addition a test bench for the forecasting of pressure oscillations in a vehicle tire, comprising test stand rim, a vehicle rim, a wheel bearing, means for applying pressure to a vehicle tire, means for applying a wheel load to the vehicle tire, means for accelerating the vehicle tire, means for detecting a tire speed, and means for detecting a load and/or tire oscillation and/or a pressure oscillation, wherein the vehicle tire can be rotatably mounted on the wheel bearing by means of the test bench rim or by means of the vehicle rim, wherein the interior of the vehicle tire can be pressurized by means of a fluid, the vehicle tire being able to be acted upon with a wheel load by means of the means for applying a wheel load to the vehicle tire, wherein the vehicle tire is able to be acted upon by means of the means for acceleration of the vehicle tire in accordance with a pre-determinable speed ramp so as to be accelerated to a final speed, so that the fluid experiences an oscillation excitation in accordance with the tire speed, and wherein the fluid reacts to the oscillation excitation with a pressure oscillation, and wherein the tire speed can be detected by means of the means for detecting the tire speed. The inventive test bench is characterized in that a force which is present at the tire, due to the pressure oscillation on the wheel bearing, can be detected by means of the means for the continuous detection of the force and/or the tire oscillation and/or the pressure oscillation, and that the test bench comprises in addition an electronic computing means, whereby the electronic computing means are designed to generate a data set or reference data set describing the force over the tire speed and over the frequency by subjecting time signal of the speed ramp to a Fourier transformation.

The wheel bearing is preferably designed and as a low friction wheel bearing, for instance as a hydrostatic slide bearing which enables a rotation of the vehicle tire.

The means for acceleration are preferably designed as one or more electric motor which, in particular, can cause a rotational acceleration of the vehicle tire via a shiftable transmission, or one or more fixed transmission steps, respectively.

The means for pressure application to the vehicle tire are preferably designed as a fluid pump, in particular an air pump, for instance as a membrane or a rotary vane pump.

The means for the application of the vehicle tire with a wheel load are preferably designed as controllable or regulated fluid cylinder which applies a pre-determinable wheel load to the vehicle tire while passing through the speed ramp. The application of the wheel load by a fluid cylinder can, during the passing through the speed ramp, be for instance constant or controllably changed.

The means for the detecting the tire speed are preferably designed to optically, magnetically, or electromagnetically detect a rotational angle per time interval either.

The means for the detecting the force and/or a tire oscillation and/or a pressure oscillation are preferably designed as force sensors, which can also detect a comparatively fast change of the acting force or forces applied to them, in particular up to 300 Hz. Especially preferred as means for the detecting the force or tire oscillations or pressure oscillations, respectively, are advantageously so-called Piezo-force sensors.

It is provided in accordance with the preferred embodiment of the invention that the test bench is designed for the execution of the inventive method.

BRIEF DESCRIPTION OF THE DRAWINGS

Hereafter, the invention is further explained based on the embodiments shown in the figures.

These show.

DETAILED DESCRIPTION OF THE PREFERRED EMBODIMENTS

The same objects, functional units and comparable components are denoted by the same reference symbols in all the figures. These objects, functional units and comparable components are designed identically with regard to their technical features, unless the description explicitly or implicitly states otherwise.

Figure 1A:
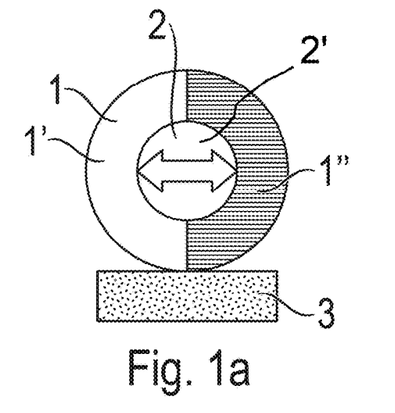
FIGS. 1a and 1b schematically an overview of the two, generally seen oscillation degrees of freedom of a fluid in the interior of a vehicle tire, FIG. 2 exemplary and schematically a data set generated in accordance with the invention, FIG. 3 exemplary and schematically a reference data set generated in accordance with the invention, and FIG. 4 schematically a test bench in accordance with the invention.
Figure 1B:
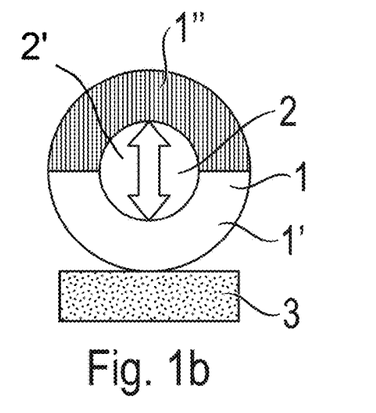

FIGS. 1a and 1b schematically show an overview of the two degrees of freedom of oscillation of a fluid that are usually seen in the interior of a vehicle tire 1 under the application of pressure. Presented in FIGS. 1a and 1b is a vehicle tire 1 which is installed on a rim and which moves over a ground 3. As a result of the movement over the ground 3, the vehicle tire 1 experiences a speed dependent oscillation excitation, which is also transmitted to the fluid in the interior of the vehicle tire 1. According to the example, the fluid is air. The oscillations of the fluid occur as periodically changing density differences of the fluid, meaning in the form of pressure oscillations of the fluid. FIG. 1*a* shows a pressure oscillation along a first degree of freedom. According to the example, the pressure oscillation (marked by a double arrow) occurs along the direction of movement of the vehicle tire 1. The pressure difference due to the pressure oscillation of the fluid in the vehicle tire 1 is illustrated by hatching: in the area 1' of the vehicle tire 1 a minimum of the pressure oscillation is shown, whereas a maximum is shown in a hatched area 1". FIG. 1*b* shows a pressure oscillation of the fluid along a second degree of freedom. In accordance with FIG. 1*b*, the fluid does not oscillate along the direction of movement of the vehicle tire 1 but perpendicular to it against the ground 3 (also presented by a double arrow). The pressure difference due to the pressure oscillation of the fluid in the vehicle tire 1 is also in FIG. 1*b* by hatching.

Figure 2:
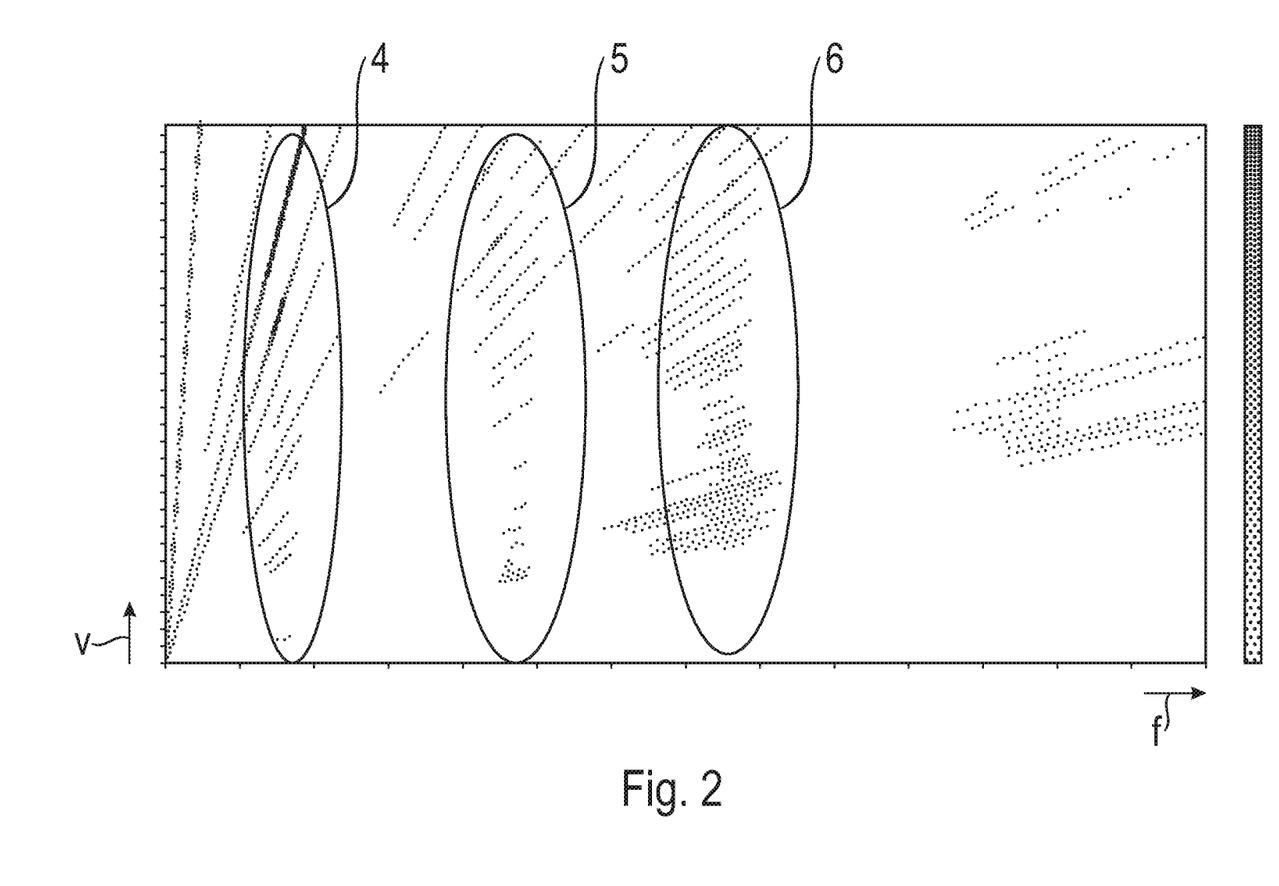

FIG. 2 shows exemplary and schematically a data set generated in accordance with the invention, which describes the force as a function of the tire speed and as a function of frequency. According to the example, the data set was generated by first rotating a vehicle tire 1 on a test bench rim 2 via a wheel bearing and pressurizing it inside by means of a fluid, for example air. Then, the vehicle tire 1 was accelerated in accordance with a pre-determinable speed ramp from the standstill to a final speed. While passing through the speed ramp, the vehicle tire 1 was also, in accordance with the invention, applied with a constant wheel load. As a result, the vehicle tire 1 was excited, in accordance with a tire speed, to a tire oscillation with a tire frequency. In the same way, the fluid in the interior of the vehicle tire 1 was, in accordance with the tire speed, excited to a pressure oscillation with a pressure frequency. The tire oscillation and the pressure oscillation both lead in each case to a force acting on the wheel bearing which was continuously detected during the entire passing through the speed ramp. Finally, the data set which is presented in FIG. 2 was generated, and where a timing signal of the speed ramp, for example a change in the detected tire force over the time during the passing through the speed ramp, was submitted to a Fourier transformation. The tire speed is in FIG. 2 presented on the y-axis and the frequency on the x-axis. The respective force can be recognized by means of a color or hatching. As can be seen in FIG. 2, in the representation of the force as a function of the tire speed and as a function of the frequency, highlighted lines are formed on which the detected force is greater than in the surrounding areas. These lines 3-16 show resonances of different orders. Where an excitation frequency meets a resonance of the vehicle tire 1 or a resonance of a fluid used for the pressure application of the vehicle tire 1, a clear increase of the detected force occurs. A multitude of resonances 4 can be seen in FIG. 2 which can be assigned to the vehicle tire 1. Also, a multitude of resonances 5 can be seen which can be assigned to the fluid, wherein the resonances 5 which are assigned to the fluid are at comparatively higher tire frequencies than the resonances 4 which are assigned to the tire. At even higher frequencies, a multitude of resonances 6 can be observed, which, however, can be assigned to the test bench used for carrying out the method according to the invention. These resonances 6 do not play a role in the determination of pressure oscillations of the vehicle tire 1 and can be disregarded accordingly in the inventive method.

Figure 3:
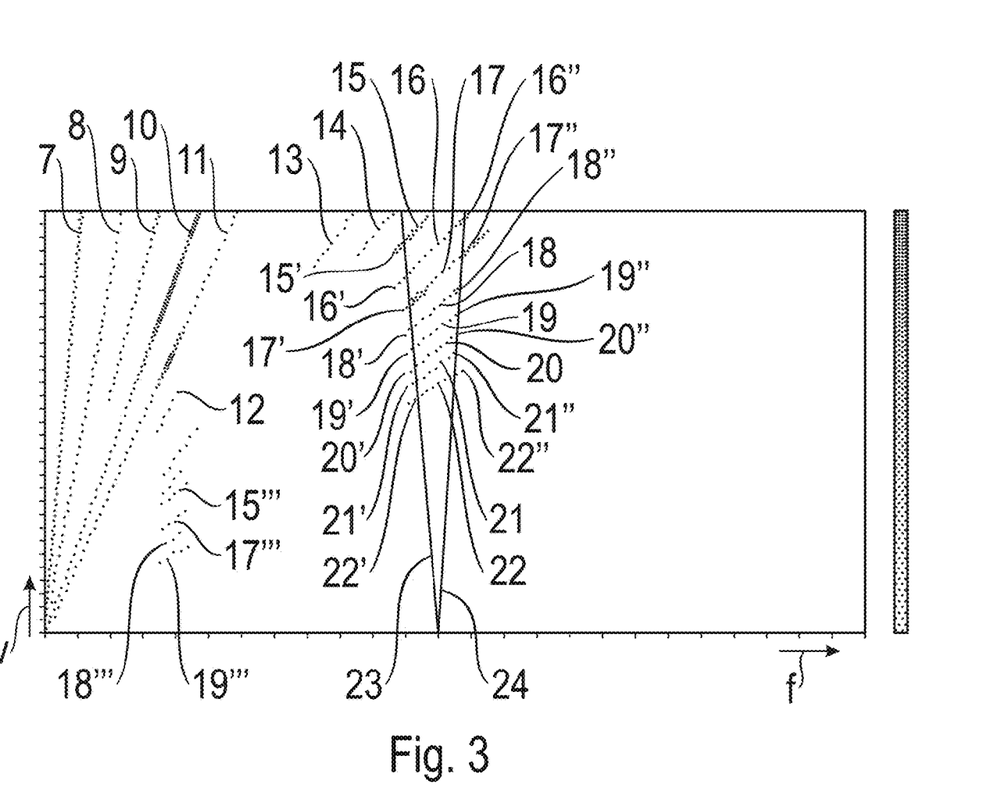

FIG. 3 shows by way of example and schematically, a reference data set generated in accordance with the invention, which mainly corresponds to the data set in FIG. 2 but is limited to a frequency range which does not have resonances 6 that can be assigned to the test bench. Also, a vehicle rim 2' was applied to generate the reference data set in FIG. 3, which means that resonances of the fluid can be monitored in those positions, i.e., at those tire speeds and frequencies where they would actually occur during operation of the vehicle tire 1 on a motor vehicle. A multitude of lines 7-22 can also be seen in the data set in FIG. 3, wherein the lines 7-22 having speed dependent or frequency dependent maxima or minima with regard to the force which is assigned to them (represented by coloring or hatching, respectively). Also, two straight lines 23 and 24 can be seen which intersect when the vehicle tire 1 is at the standstill, meaning they intersect at the speed zero in the data set. The straight lines 23 and 24 are, starting from the standstill of the vehicle tire 1, are placed by maxima 15'-22', 16"-22" of forces of different oscillation orders that fan out in a V-shape. The intersections of the straight lines 23 and 24 with the lines 15-22 or with their maxima 15'-22', 16"-22" represent the resonances of the fluids in the interior of vehicle tire 1. From the resonances of the fluid identified by means of the two straight lines 23 and 24 and the resonances 15'", 17'", 18'", and 19'" which are also contained in the data set of the vehicle tire 1 of the lines 15, 17, 18, and 19, a first relative ratio is now generated in accordance with the invention which describes the amplitude of each of the resonances 15'", 17'", 18'", and 19'" in the relation to the amplitude of the resonances 15', 17', 18', 19' of the same order, as well as a second relative ratio which describes the position of each of the resonances 15'", 17'", 18'", and 19'", each in relation to the position of the resonances 15', 17', 18', 19' of the same order. By means of the first and second relative ratio determined in this manner, the amplitudes and positions of resonances of the fluid can mathematically be computed in a simple way at the test bench on a test bench rim 2 which would occur in the actual operation of the vehicle tire 1 on a motor vehicle, meaning on a vehicle rim 2'.

Figure 4:
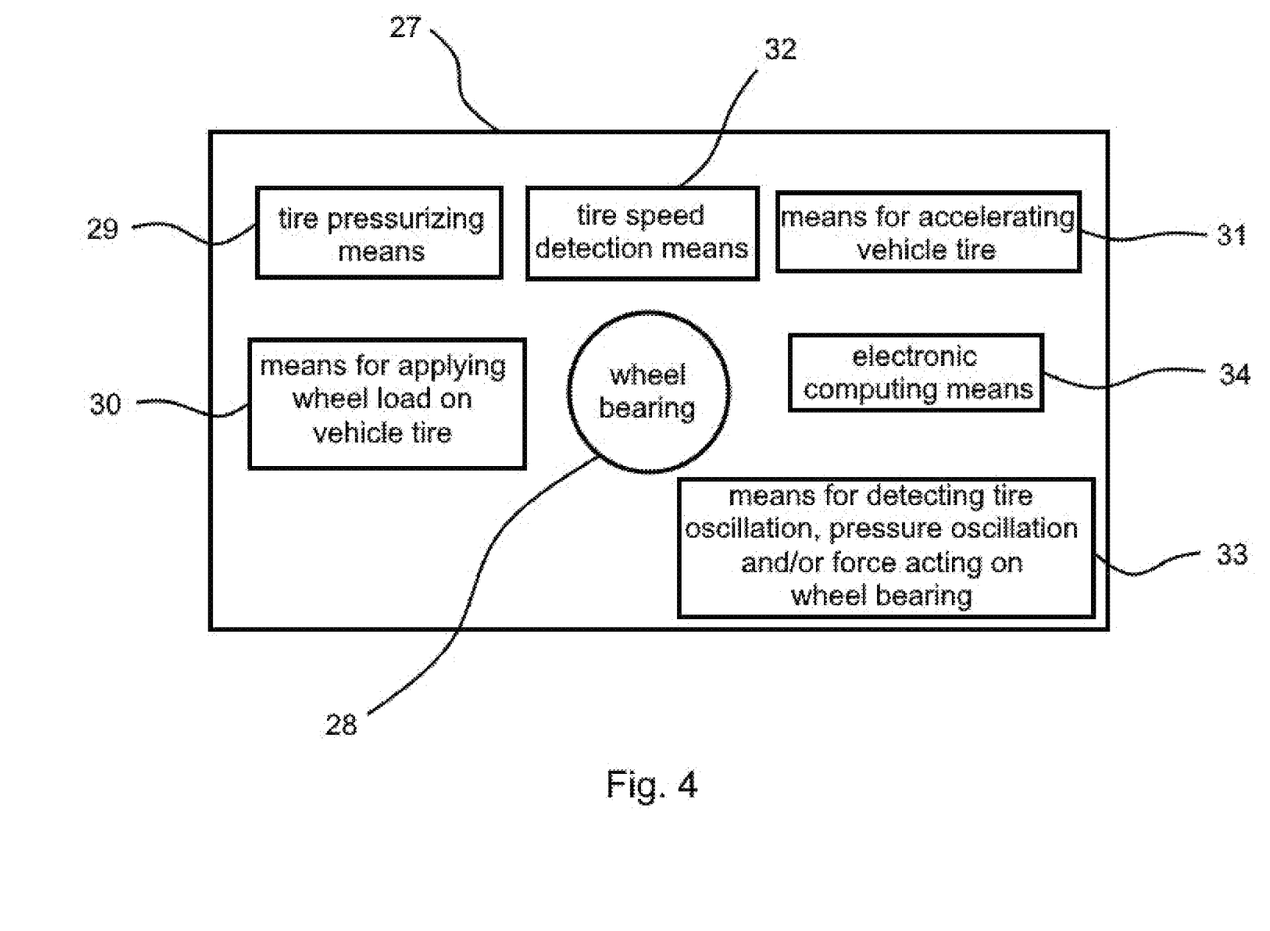

FIG. 4 schematically shows a test bench 27 for the forecasting of pressure oscillations in a vehicle tire, comprising test stand rim, a vehicle rim, a wheel bearing 28, means for applying pressure to a vehicle tire 29, means for applying a wheel load to the vehicle tire 30, means for accelerating the vehicle tire 31, means for detecting a tire speed 32, and means for detecting a load and/or tire oscillation and/or a pressure oscillation 33, wherein the vehicle tire 1 can be rotatably mounted on the wheel bearing 28 by means of the test bench rim 2 or by means of the vehicle rim 2', wherein the interior of the vehicle tire can be pressurized by means of a fluid, the vehicle tire being able to be acted upon with a wheel load by means of the means for applying a wheel load to the vehicle tire 30, wherein the vehicle tire is able to be acted upon by means of the means for acceleration of the vehicle tire 31 in accordance with a pre-determinable speed ramp so as to be accelerated to a final speed, so that the fluid experiences an oscillation excitation in accordance with the tire speed, and wherein the fluid reacts to the oscillation excitation with a pressure oscillation, and wherein the tire speed can be detected by means of the means for detecting the tire speed 32. The inventive test bench 27 is characterized in that a force which is present at the tire, due to the pressure oscillation on the wheel bearing 28, can be detected by means of the means for the continuous detection of the force and/or the tire oscillation and/or the pressure oscillation 33, and that the test bench comprises in addition an electronic computing means 34, whereby the electronic computing means 34 are designed to generate a data set or reference data set describing the force over the tire speed and over the frequency by subjecting time signal of the speed ramp to a Fourier transformation.

REFERENCE CHARACTERS

1 Vehicle Tire
1' Minimum of the pressure oscillation
1" maximum of the pressure oscillation
2 Test Bench Rim
3 Ground
4 Resonances of the Vehicle Tire
5 Resonances of the Fluid
6 Resonances of the Test Bench
7-22 Lines, Resonances
15'-22' Maxima, Resonances
16"-22" Maxima, Resonances
15'''-19''' Maxima, Resonances
23, 24 Straight Line
27 Test Bench
28 Wheel Bearing
29 Tire Pressurizing Means
30 Means for Applying a Wheel Load
31 Means for Accelerating the Vehicle Tire
32 Means for Detecting a Tire Speed
33 Means for Detecting Force, Tire and/or Pressure Oscillation
34 Electronic Computing Means

The invention claimed is:

1. A method for predicting pressure oscillations in a vehicle tire that is mounted on either a test bench rim or a vehicle rim which is rotatably mounted, via a wheel bearing, on a test bench, an interior of the vehicle tire being pressurized with a fluid to a fluid pressure, the vehicle tire being subjected to a wheel load, the vehicle tire being rotationally accelerated in accordance with a predetermined speed ramp from an initial tire speed at a start time of the speed ramp to a final tire speed at an end time of the speed ramp, wherein during rotation of the vehicle tire from the start time to the end time of the speed ramp, the fluid within the vehicle tire undergoes tire speed dependent oscillation excitation, and the oscillation excitation of the fluid causes pressure oscillation of the fluid within the vehicle tire which is detectable as a force acting from the vehicle tire on the wheel bearing, the method comprising:

mounting the vehicle tire on one of the test bench rim and the vehicle rim which is rotatably mounted, via the wheel bearing, on the test bench, from the start time to the end time of the speed ramp continuously detecting, at the wheel bearing, the forces acting on the vehicle tire due to the pressure oscillation, the forces being detected at the wheel bearing with force sensors, generating a data set that characterize the forces acting on the wheel bearing from the vehicle tire over the tire speeds of the speed ramp and over frequencies of tire oscillations and frequencies of the pressure oscillations by subjecting a time signal of the speed ramp to a Fourier transformation, when the vehicle tire is mounted on the test bench rim, the data set is a generated data set, and when the vehicle tire is mounted on the vehicle rim, the data set is a reference data set, and repeating the method with the vehicle tire being mounted on the other one of the test bench rim and the vehicle rim, determining the pressure oscillations in the vehicle tire by comparing the forces acting on the wheel bearing over the frequencies of tire oscillations in the generated data set relative to a ratio of the forces acting on the wheel bearing over the frequencies of the tire oscillations and the frequencies of the pressure oscillations in the reference data set.

2. The method according to claim 1, further comprising determining amplitudes and positions of resonances of the fluid in the generated data set and in the reference data set by two straight lines which are aligned on maxima of the fluid oscillations of different orders and which intersect when the vehicle tire is at standstill.

3. The method according to claim 2, further comprising placing the straight lines on the maxima of the fluid oscillations of different oscillation orders starting from the standstill of the vehicle tire such that the straight lines are V-shaped and represent the resonances of the fluid in an interior of the vehicle tire.

4. The method according to claim 2, further comprising classifying a geometry of the vehicle tire by comparing the amplitudes of the resonances of the fluids with the reference amplitudes in a predetermined frequency range over a tire speed range.

5. The method according to claim 4, further comprising predetermining the frequency range and the tire speed range in accordance with a classification of the vehicle for which the vehicle tire is to be used and a size and width of the vehicle tire, the classification of the vehicle being one of a sports car, a sport utility vehicle, a truck, or an agricultural machine.

6. The method according to claim 1, further comprising exclusively considering maxima of oscillation orders larger than the tenth order.

7. The method according to claim 1, further comprising that exclusively considering maxima in a frequency range of 140 Hz to 300 Hz.

8. The method according to claim 1, further comprising in the data set, determining:

amplitudes of resonances of the fluid, and amplitudes of resonances of a structure of the vehicle tire of the same order, and generating a first relative ratio from the amplitudes of resonances of the fluid and the amplitudes of resonances of the structure of the vehicle tire; and/or positions of resonances of the fluid, and positions of resonances of the vehicle tire of the same order, and generating a second relative ratio from the positions of resonances of the fluid and the positions of resonances of the vehicle tire.

9. The method according to claim 8, further comprising, as contained in the data set, from the amplitudes of the resonances of the structure of the vehicle tire and the first relative ratio, the resonances of the fluids are determined and/or, contained in the data set, from positions of resonances of the vehicle tire and the second relative ratio, the positions of the resonances of the fluids are determined.

10. The method according to claim 8, further comprising that the generated data set and the reference data set comprise a tire force value for each value pair of tire speed and tire frequency.

11. The method according to claim 1, further comprising that the Fourier transformation is a fast Fourier transformation.

12. A test bench for predicting pressure oscillations in a vehicle tire, comprising:
- a test bench rim,
- a vehicle rim,
- a wheel bearing,
- means for pressurizing the vehicle tire,
- means applying a wheel load on the vehicle tire,
- means for accelerating the vehicle tire,
- an optical, magnetic or electromagnetic means for detecting a tire rotational speed, the optical, magnetic or electromagnetic means being configured to detect an angle of rotation per unit of time,
- means for detecting at least one of a force, a tire oscillation, and a pressure oscillation,
- the vehicle tire being positioned on the test bench rim or the vehicle rim which is rotatably mounted, via a wheel bearing, on a test bench,
- an interior of the vehicle tire being pressurized with a fluid to a fluid pressure by the means for pressurizing the vehicle tire,
- the vehicle tire being subjected to the wheel load by the means for applying the wheel load on the vehicle tire,
- the vehicle tire being accelerated according to a predetermined speed ramp, the vehicle tire being accelerated by the means for accelerating the vehicle tire from an initial tire rotational speed at a start time of the speed ramp to a final tire rotational speed at an end time of the speed ramp so that the fluid, in accordance with the tire rotational speed, undergoes an oscillation excitement, and the fluid reacts to the oscillation excitement with a pressure oscillation,
- the vehicle tire is mounted on one of the test bench rim and a vehicle rim which is rotatably mounted, via the wheel bearing, on the test bench,
- the tire rotational speed being detected by the optical, magnetic or electromagnetic means for detecting the tire rotational speed, and forces of the vehicle tire acting on the wheel bearing, due to the pressure oscillation, being continuously detected from the start time to the end time of the speed ramp by the means for the detecting the at least one of the force, the tire oscillation, and the pressure oscillation, and
- the test bench further comprising a means for electronic computing, the means for electronic computing being configured to generate a generated data set, or a reference data set, for the force of the vehicle tire over the tire rotational speed and over frequency, whereby a time signal of the speed ramp is submitted to a Fourier transformation.

13. The test bench according to claim 12, further comprising that the test bench is configured to execute a method for predicting pressure oscillations in a vehicle tire, the method comprising:
- continuously detecting, at the wheel bearing, forces acting on the vehicle tire due to the pressure oscillation, and
- generating the generated data set and the reference data set by subjecting a time signal of the speed ramp to a Fourier transformation, and determining the pressure oscillations in the vehicle tire by comparing the forces acting on the wheel bearing over the frequencies of tire oscillations in the generated the data set relative to a ratio of the forces acting on the wheel bearing over the frequencies of the tire oscillations and the frequencies of the pressure oscillations in the reference data.

* * * * *